March 10, 1936.  F. LEISTER ET AL  2,033,771
BEARING
Filed March 14, 1934
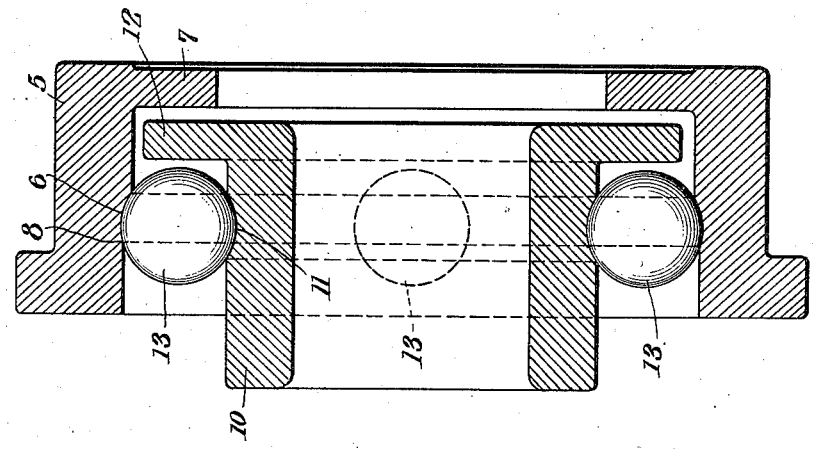
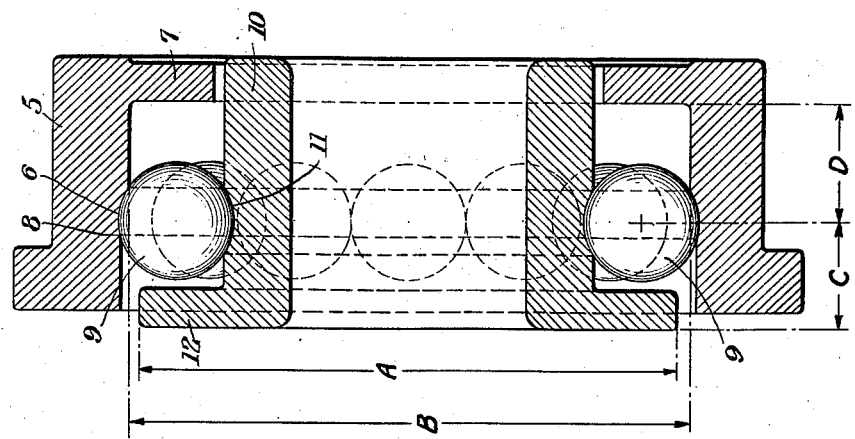
FAYETTE LEISTER
FRANK T. LYNCH  INVENTORS
BY Mitchell & Bechtel
ATTORNEYS.

Patented Mar. 10, 1936

2,033,771

UNITED STATES PATENT OFFICE 2,033,771

BEARING

Fayette Leister and Frank T. Lynch, New Britain, Conn., assignors to The Fafnir Bearing Company, New Britain, Conn., a corporation of Connecticut Application March 14, 1934, Serial No. 715,412

5 Claims. (Cl. 29—84)

Our invention relates to a ball bearing.

During the process of manufacture of all better grade ball bearings, the bearings are "matched"; that is to say, particular sized balls are selected for insertion between particular sized rings so as to secure the proper fit.

Balls may be very accurately made and graded to size so that balls of a particular size vary from each other by 1/10000 of an inch or less. It is possible to grind the raceway grooves in the rings to the degree of accuracy to which the balls have been graded, but grinding to such close tolerances is exceedingly expensive and impracticable from a manufacturing point of view.

One method of matching which has been used consists first in assuming a particular size of ball to be employed, then grinding the outer ring to size with reasonable manufacturing tolerances, and then grinding the inner ring (with reasonable manufacturing tolerances) to fit the particular inner ring and balls of selected size. The rings are then put together and a few balls inserted between the rings to ascertain the fit of the rings and balls. If the fit is too loose, the next larger ball size would be selected and the bearing again "matched" and this process repeated with "matching" balls of known size until just the desired fit is obtained. The bearing is then loaded with its full complement of bearing balls of the size determined by the matching process.

In the bearing forming part of our invention, the outer ring is provided with an inwardly extending integral seal flange at one side of the bearing, and the inner ring is provided with an outwardly directed integral seal flange at the opposite side of the bearing. Matching by the process above described is impossible, or, at least, impracticable, for the reason that the seal flanges so completely enclose the ball space as to render it impossible to readily insert and distribute matching balls and thereafter remove such balls.

It is an object of our invention, therefore, to provide a method of matching for ball bearings where the usual methods may not be satisfactorily employed.

It is a further object to provide a bearing having integral seals on the inner and outer rings sealing the ball space and so proportioned that the bearing may be readily matched.

Other objects and features of invention will be hereinafter pointed out or will become apparent upon a reading of the specification.

In the drawing which shows, for illustrative purposes only, a preferred form of the invention—

Fig. 1 is a central sectional view of a completely assembled bearing illustrative of the invention;

Fig. 2 is a central sectional view of the bearing positioned and arranged for matching.

In said drawing, 5 indicates an outer bearing ring having a ball groove 6 therein. At one side the outer ring is an inwardly directed integral seal flange 7 extending into sealing proximity to the inner ring. The outer side of the outer ring 5 is enlarged up to the ball groove 6 but preferably a shoulder 8 is left and over which the balls 9 must be snapped when the bearing is assembled.

The inner ring 10 is provided with a ball groove 11 and when the bearing is assembled the balls 9 run in the grooves 6—11, as will be understood. The inner ring 10 has an outwardly directed integral seal flange 12 at the side of the bearing opposite the integral seal flange 7. The flange 12 extends into sealing proximity to the outer ring 5 so that the ball space is substantially completely sealed against the loss of grease and the entry of foreign matter. The drawing discloses a bearing on a very much enlarged scale so that the spaces between the integral seal flanges and the opposed rings are shown as quite large, but it is to be understood that, in practice, these spaces are, in fact, very small so as to have the sealing effect above noted.

In Fig. 1 a fully assembled bearing is disclosed. The raceway grooves in the rings are not in the longitudinal centers of the rings as is usual in ball bearings, but the grooves are displaced endwise of the rings so that in the form illustrated the distance marked "C" in Fig. 1 is less than the distance marked "D" for a purpose to be described. Furthermore, the diameter of the integral seal flange 12 indicated as "A" on the drawing is less than the inner diameter of the outer ring marked "B" on the drawing. These proportions are of importance in the particular bearing shown. It is obvious that with the rings 5—10 positioned as shown in Fig. 1 it would be impossible, or, at least, utterly impracticable, to match the bearing, for the reason that even though the rings were eccentrically displaced to some extent and a few matching balls were inserted between the rings, it would be exceedingly difficult and impracticable to get the balls sufficiently distributed to properly determine the fit between the two rings and the matching balls and thereafter remove the matching balls. However, with the distance "A" less than the distance "B" and the distance "C" less than the distance "D", the rings may be turned relatively end for end and positioned as shown in Fig. 2 so that the races 6—11 face each other, and yet there is no interference between parts of the bearing rings as would be the case if the raceway grooves were positioned centrally of the rings.

With the rings positioned as shown in Fig. 2, it is clear that they may be eccentrically displaced and the requisite number of matching balls 13—13 inserted between the rings and circumferentially distributed. When the proper ball size has been determined by the selection of proper sized matching balls, the rings are again turned end for end so as to be positioned as shown in Fig. 1, and the full complement of bearing balls snapped into place and the assembly of the bearing is then complete. In order to facilitate assembly and permit the use of a deeper groove 6, the bearing rings may be subjected to different temperatures; for example, the outer ring may be heated so as to expand the same and thus increase the space between the two rings so that the bearing balls may be more readily forced over the shoulder 8 and into the groove 6. When the bearing is assembled, end thrust will be taken in both directions.

While the invention has been described in considerable detail and a specific form shown, it is to be understood that we do not wish to be strictly limited to that form. Furthermore, by designating the distances "A", "B", "C" and "D", we do not wish to limit ourselves to the particular bearing shown. The distances "A", "B", "C", and "D" are used merely to indicate distances which will permit an assembly of the rings reversed from the normal as disclosed in Fig. 2.

The raceway grooves could be displaced toward the opposite end of the bearing from that shown, in which case the matching could be done by slipping the inner ring through the opening defined by the flange 7 until the grooves stand opposite each other. Furthermore, when the design permits, one of the seal flanges could be displaced inwardly from the edge of the ring to such an extent that the raceway grooves could be positioned in the central plane of the bearing.

Various changes and modifications may be made within the scope of the invention as defined in the appended claims.

We claim:

1. An antifriction bearing comprising inner and outer bearing rings, said rings having opposed raceway grooves with anti-friction bearing elements seated therein, said outer ring having an inwardly directed sealing flange at one side of the bearing, said inner ring having an outwardly directed sealing flange at the opposite side of the bearing, said bearing being characterized by having the diameter of the flange on said inner ring less than the inside diameter of said outer ring whereby said flange may be received in said outer ring, and the distance from the outer face of the flange on said inner ring to the central plane of said raceway grooves less than the distance from the central plane of said raceway grooves to the inner face of the flange on said outer ring.

2. A single row anti-friction bearing comprising inner and outer bearing rings, said rings having opposed raceway grooves with a single row of anti-friction bearing elements seated therein and holding said rings in unit handling relation, said outer ring having an inwardly directed sealing flange at one side of the bearing, said inner ring having an outwardly directed sealing flange at the opposite side of the bearing, said bearing being characterized by having raceway grooves displaced axially to one side of the center of the bearing for the purpose set forth.

3. The method of matching a ball bearing comprising inner and outer bearing rings with opposed raceway grooves and each having an integral radially extending sealing flange at the sides so as to normally completely enclose the ball space, which comprises turning one of said rings relatively to the other end for end so as to bring said sealing flanges adjacent to each other and until the ball races are in opposition to each other so as to leave one side of the bearing open, then eccentrically displacing the rings and inserting a few balls for matching, then removing said matching balls and turning one of said rings end for end into normal end relation to the other ring, and then inserting the full complement of bearing balls in said raceway grooves.

4. The method of matching a ball bearing comprising inner and outer bearing rings with opposed raceway grooves and means which normally obstructs the space between said rings so as to prevent the normal ready entry of matching balls therebetween by eccentric displacement of said rings, which method comprises turning one of said rings relatively to the other end for end and inserting the inner ring within the outer ring until the raceway grooves in said rings stand opposite each other, eccentrically displacing the rings and inserting a few balls for matching, then removing said matching balls, separating said rings and turning one of said rings end for end into normal end relation to the other ring, and then inserting the full complement of bearing balls in said raceway grooves.

5. A single row anti-friction bearing comprising inner and outer bearing rings, said rings having opposed raceway grooves with a single row of anti-friction bearing elements seated therein and holding said rings in unit handling relation, said outer ring having an inwardly directed sealing flange at one side of the bearing and having a passage therethrough of sufficient size to admit one end of the inner ring, said inner ring having an outwardly directed sealing flange at the opposite side of the bearing and of a size capable of passing into the outer ring, said bearing being characterized by having raceway grooves displaced axially to one side of the center of the bearing, for the purpose set forth.

FAYETTE LEISTER.
FRANK T. LYNCH.